J. DE MARTINO.
CLUTCH AND TRANSMISSION.
APPLICATION FILED NOV. 28, 1919.
1,428,221.
Patented Sept. 5, 1922.
2 SHEETS—SHEET 2.
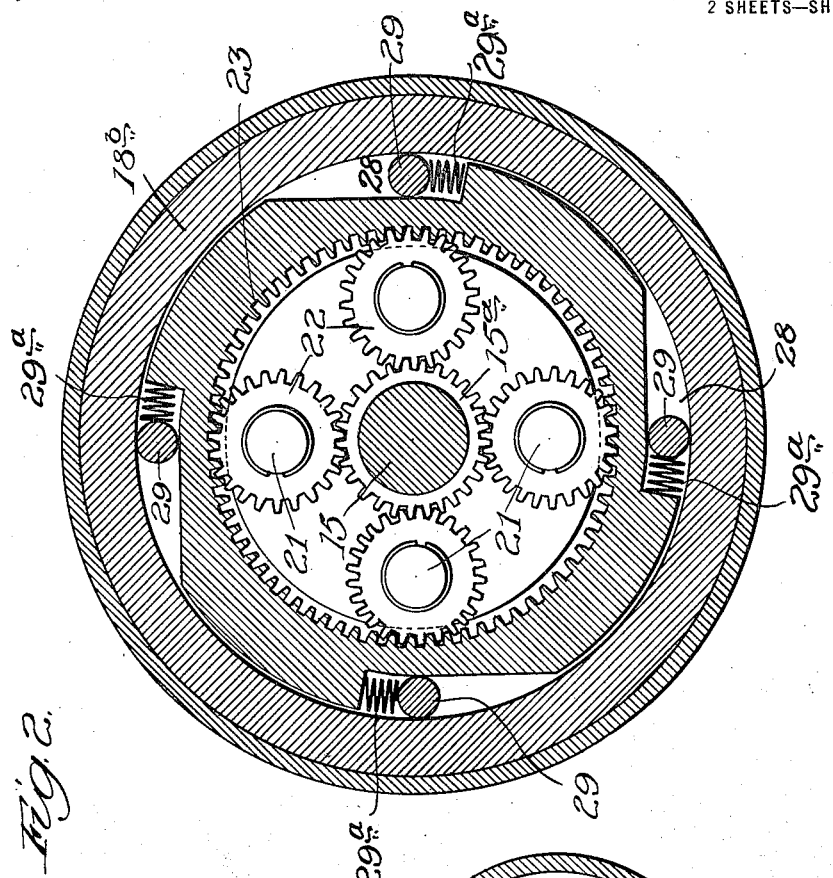
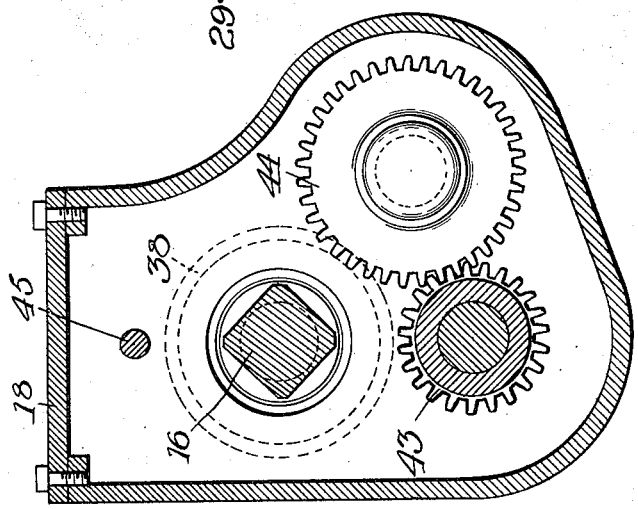
Inventor:
Joseph de Martino, Patented Sept. 5, 1922.

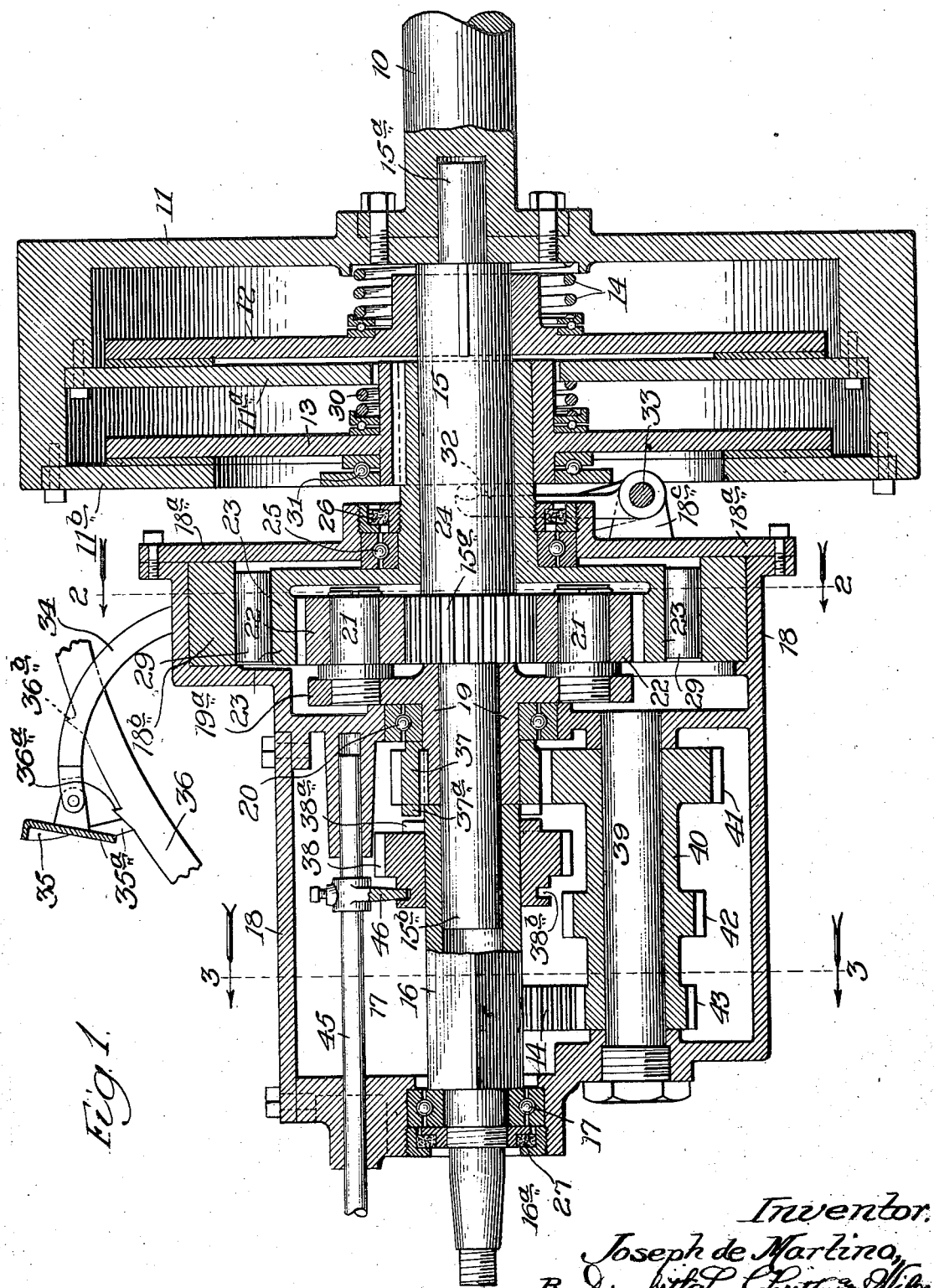

1,428,221

UNITED STATES PATENT OFFICE.

JOSEPH DE MARTINO, OF CHICAGO, ILLINOIS, ASSIGNOR TO JOHN H. LEE, TRUSTEE, OF CHICAGO, ILLINOIS.

CLUTCH AND TRANSMISSION.

Application filed November 28, 1919. Serial No. 340,978.

*To all whom it may concern:*

Be it known that I, JOSEPH DE MARTINO, subject of the King of Italy, residing at Chicago, in the county of Cook and State of Illinois, have invented a new and useful Improvement in Clutches and Transmissions, of which the following is a specification.

My invention relates to a clutch and transmission for automobiles, and is fully described in the following specification and shown in the accompanying drawing, in which Figure 1 is a vertical longitudinal section through clutch and transmission;
Fig. 2 is a section on the line 2—2 of Fig. 1, and Fig. 3 is a section on the line 3—3 of Fig. 1.

This is an improved form of the clutch and transmission shown in my co-pending application, Serial No. 306,065, filed June 23, 1919. I have illustrated an embodiment of my invention of a clutch and transmission in an automobile engine crank shaft 10 which has bolted thereto a fly-wheel. This flywheel has secured thereto two annular disks $11^a$ and $11^b$ which are adapted to engage the friction disks 12 and 13 respectively. The friction disk 12 is normally pressed against the annular disk $11^a$ by means of a spring 14, and is slidably keyed to an intermediate shaft 15. The forward end of this shaft has a restricted concentric pin $15^a$ which is journalled in the end of the crank shaft 10.
The rear end of the intermediate end $15^b$ of the intermediate shaft 15 is also reduced and is journalled in the propeller shaft 16 which in turn is carried by the ball-bearing 17 in the housing 18. The reduced shaft $15^b$ also carries a sleeve member 19 which is carried by the ball-bearing 20 in the housing 18.

The sleeve 19 has a spider $19^a$ in which are secured pins 21. Each of these pins has journalled thereon a gear 22 which meshes with the sun gear $15^c$ which is secured to the intermediate shaft 15. The gears 22 also mesh with the annular gear 23 which is carried by a sleeve 24 which is journalled on the shaft 15. A ball-bearing 25 is also provided between this sleeve and the cover plate $18^a$ of the transmission housing 18. Felt rings 26 and 27 are also placed at the sides of the ball-bearings 25 and 17 respectively. Pockets 28 are formed in the periphery of the gear 23 which are sloping in one direction and have an abrupt abutment in the other, and in which locking rollers 29 are adapted to lie. These rollers will lightly engage the inner face of the annular wall $18^b$ of the transmission housing when the gear 23 is turned in the direction of the arrow, Fig. 2. When, however, the gear 23 is reversed rollers 29 roll up the inclined face of the opening 28 and grip the annular face $18^b$ thereby locking the gear 23 from rotation in that direction.

A spring $29^a$ is added to make the action of the rollers more certain and uniform.

The friction disk 13 is slidably keyed on the sleeve 24 and is normally pressed into engagement in the annular disk $11^b$ by the spring 30. A ball-bearing 31 is provided on the opposite side of the disk 13 against which bear the bifurcated fingers 32 which are secured to a shaft 33. This shaft is journalled in lugs $18^q$ on the transmission cover, and has secured thereto a clutch lever 34. The upper end of this lever has pivotally secured thereto a pedal 35 which has a pawl $35^a$ which is adapted to engage notches $36^a$ and $36^b$ in the quadrant 36.

The sleeve 19 has secured thereon a gear 37, the rear face of which has teeth $37^a$. A gear 38 is slidably mounted upon the propeller shaft 16 which is preferably formed square. This gear has teeth $38^a$ which engage the teeth $37^a$ in gear 37.

Immediately below the shaft 16 and spaced some distance therefrom is a pin 39 which is secured at its ends in the housing 18. A cone gear 40 is journalled thereon and has gears 41, 42 and 43. The gear 41 is constantly in mesh with the gear 37. The gear 38 is adapted to mesh with the gear 42, and also with the idler gear 44, which lies behind the gear 43 and is constantly in mesh therewith.

A shift rod 45 which is slidably mounted in the housing carries a finger 46 which engages an annular groove $38^b$ in the hub of the gear 38.

The operation of my clutch and transmission is as follows:

The two clutch elements 12 and 13 are normally in engagement with the annular disks $11^a$ and $11^b$ as shown in Fig. 1 under the usual driving conditions. In that case the shaft 15 and the sleeve 24 are turned with the crank shaft, and consequently the gears 15ª and 23 which they carry propel the gears 22 and consequently the sleeve 19 and the gear 37 at the same speed.

When the gear 38 is moved to the extreme right hand position it is engaged with the gear 37 by means of the clutch teeth 37ª and 38ª, and the propeller shaft 16 is accordingly driven at the same speed as the engine crank shaft. It will be understood that connection is made with the stub end 16ª of the propeller shaft by means of the usual automobile propeller shaft or in any other desired manner.

With both of the clutch elements 12 and 13 in engagement, and the gear 38 meshing with the gear 42 the drive will take place through the gear 37 as was just explained. This gear, however, will now drive the gear 41 which in turn will drive the gear 42 and it the gear 38 thereby driving the propeller shaft 16 at a reduced speed. With the gear 38 in mesh with the idler 44 the drive will now take place from the gear 37 through the gears 41, 43 and 44 of the sliding gear 38 and will be driven at a slow speed thereby in the reverse direction.

If now the clutch lever 34 is pushed forward until the pawl 35ª engages the notch 36ª the friction disk 13 will be disengaged from the annular disk 11ᵇ. The drive will now take place through the clutch element 12 and the shaft 15. As soon as the clutch element 13 is released and the shaft 15 is turned in the usual forward direction, the tendency of the gear 23 is to run in the reverse direction. This, however, is prevented by the roller 29 of the overrunning clutch as shown in Fig. 2 which now locks, thereby making the annular gear 23 stationary.

As the gear 15ª on the shaft 15 turns it carries the gears 22 forward thereby driving the sleeve 19 and the gear 37. The speed of the shaft 19, however, is slower than that of the shafts 15 and 10.

The gear 38 may now be shifted as before, namely, to the right so as to engage the gear 37 and be driven thereby at the same speed, or be shifted to the left so as to engage the gear 42 for a slower forward speed, or be shifted still further and be meshed with the gear 44 so as to get very slow reverse.

While I have shown and described but a single embodiment of my invention, it is to be understood that it is capable of many modifications. Changes therefore in the construction and arrangement may be made without departing from the spirit and scope of the invention as disclosed in the appended claims.

What I claim as new and desire to secure by Letters Patent is:

1. A transmission comprising in combination, a driving member, an intermediate shaft and a propeller shaft in axial alignment, a sleeve upon said intermediate shaft, means to drive said intermediate shaft only or said intermediate shaft and sleeve in unison at will, sun and universe gears carried by said intermediate shaft and said sleeve respectively, a spider adapted to revolve upon the axis of said shafts, planet gears carried by said spider and meshing with said sun and universe gears, means to automatically lock said universe gear upon initial reverse movements, and means to drive said propeller shaft through said spider.

2. A transmission comprising in combination, a stationary casing, a sleeve journaled in and projecting from said casing, a shaft journaled in and projecting from said sleeve, means to at will drive said shaft alone or said shaft and sleeve in unison, sun and universe gears carried by said shaft and sleeve respectively, a partition in said casing, a spider journaled in said partition, planet gears carried by said spider in mesh with said sun and universe gears, a propeller shaft journaled in said casing and means to drive said propeller shaft actuated by said spider.

3. A transmission comprising in combination, a stationary casing, bearings in opposite ends of said casing, an intermediate bearing member in said casing, a sleeve journaled in one of said first named bearings and projecting from the casing, a shaft journaled in said sleeve and projecting therefrom exterior of the casing, means to at will drive said shaft alone or said shaft and sleeve in unison, sun and universe gears carried by said shaft and sleeve respectively within said casing, a spider journaled in said intermediate bearing member, planet gears carried by said spider in mesh with said sun and planet gears, a propeller shaft journaled in the other of said first named bearings, a counter shaft journaled in said casing and said bearing member on an axis parallel with said propeller shaft, constantly meshing gears on said spider and counter shaft and a sliding gear adapted to be driven by said counter shaft to actuate said propeller shaft.

JOSEPH DE MARTINO.